United States Patent [19]

Vegeais et al.

[11] Patent Number: 5,583,645
[45] Date of Patent: Dec. 10, 1996

[54] PRINTING METHOD AND APPARATUS FOR FACSIMILE

[75] Inventors: Patrick Vegeais, Fourqueux; Alain Frederic, Cergy, both of France

[73] Assignee: Societe d'Applications Generales d'Electricite et de Mecanique Sagem, France

[21] Appl. No.: 193,539

[22] Filed: Feb. 8, 1994

[30] Foreign Application Priority Data

Feb. 15, 1993 [FR] France .................. 93 01670

[51] Int. Cl.$^6$ .................................................. H04N 1/21
[52] U.S. Cl. .................... 358/296; 358/406; 355/234
[58] Field of Search ..................... 358/296, 406, 358/419–23, 488; 355/234, 235; 347/129, 135, 144, 247–9, 250; 346/86, 132, 138

[56] References Cited

U.S. PATENT DOCUMENTS

| | | | |
|---|---|---|---|
| 4,287,461 | 9/1981 | Promis et al. | 318/571 |
| 4,706,127 | 11/1987 | Nobuta | 358/280 |
| 4,752,809 | 6/1988 | Ito et al. | 355/14 |
| 4,862,289 | 8/1989 | Shimida | 358/298 |
| 4,885,641 | 12/1989 | Kato | 358/296 |
| 4,893,258 | 6/1990 | Sakuragi | 364/521 |
| 5,093,730 | 3/1992 | Ishii et al. | 358/296 |
| 5,101,283 | 3/1992 | Seki et al. | 358/456 |
| 5,128,699 | 7/1992 | Nakajima et al. | 346/160 |
| 5,278,581 | 1/1994 | Fukuyama et al. | 346/108 |
| 5,392,138 | 2/1995 | Ootsuka et al. | 358/498 |

FOREIGN PATENT DOCUMENTS 9108639  6/1991  WIPO .

Primary Examiner—Peter S. Wong
Assistant Examiner—Gregory J. Toatley, Jr.
Attorney, Agent, or Firm—Larson and Taylor

[57] ABSTRACT

The apparatus comprises a light source, generally a laser diode, providing a beam that is modulated by an input signal and is controlled for scanning, at a rate fixed by a clock, along a generatrix line of a photosensitive drum which is rotated by a motor; it further includes a memory for storing input data representing successive pixels of all lines in a page which were scanned for transmission, and a computer for determining the length to be reproduced of the transmitted document, and for determining the width, necessary to avoid truncating the infor mation contained in any of the scan lines, in the width direction. The computer calculates the minimum vertical reduction ratio Rv and the minimum horizontal reduction ratio Rh that should be adopted in order to enable the useful information to be reproduced in length and width and selects the smaller ratios. The frequency of the clock and the motor of the drum are controlled to achieve the smaller reduction ratio both in the horizontal direction and in the vertical direction.

9 Claims, 1 Drawing Sheet

PRINTING METHOD AND APPARATUS FOR FACSIMILE

BACKGROUND OF THE INVENTION

The present invention relates to methods and apparatuses for facsimile printing on paper sheets of constant and predetermined format. More particularly, the invention relates to printing methods comprising the steps of storing the pixels of all scanned lines of each page in turn for each transmitted document page, determining the number of lines of predetermined spacing to be reproduced and printing the page pixel by pixel, one line after another.

A particular important application of the invention lies with facsimile machines that print using an electro-photographic technique on precut sheets at a standardized format (generally A4 size in Europe).

Due to printing requirements, it is not possible to use the entire surface area of the sheet. The usable portion is limited by the need to reserve a few milimeters at the bottom of the sheet for taking hold of the sheet. When printing is performed by an electro-photographic technique, it is not possible to deposit ink or toner on the side margins of the paper. Finally, provision is generally made to print a call identification line or CIL consisting of alphanumeric characters at the top of the sheet. In general, the available area of an A4 size sheet (i.e. 210 mm×297 mm) is only 208 mm×289 mm.

In addition, the document as sent may have a format that is larger than the sheet format used for reproduction: in particular, its format may be B4 or the American foolscap of length 330 mm.

In the design of present facsimile machines, either the problem has been ignored, in which case information is lost if blank edges are not reserved in the document sent, or else attempts have been made to provide solutions that are not fully satisfactory.

One of the solutions that is already in use to take into account the impossibility of using the full length of a sheet may be called "line skip" or "nibbling" and is described in particular in documents WO-A-9108639 and WO-A-4885641 to which reference may be made. It consists in shortening the length to be printed by omitting lines of pixels at regular intervals. This technique reduces readability, and in particular can make some letters indistinguishable. It changes the shapes of figures: for example, a circle becomes an oval.

SUMMARY OF THE INVENTION

An object of the present invention is to provide a printing method and apparatus enabling optimum use to be made of the sheet of paper on which printing is performed. To this end, there is provided a method comprising the steps of:

storing pixels of all successive scanned lines having a predetermined spacing in each page containing data to be printed in a memory, as each said page is received as signal.

determining a significant height in said page, said height containing said data to be printed;

computing a ratio between a predetermined height available for printing on said paper sheet and said significant height; and printing each said page, pixel per pixel and line after line, with a vertical spacing between lines of pixels which is equal to said predetermined spacing, multiplied by said reduction ratio.

In a first embodiment, the spacing between the print lines is merely limited by the constraint that said spacing must not exceed the spacing of the scan lines (i.e. by the constraint that only a reduction in length is allowed). However, any reduction in length then deforms drawings on the sheet. In addition, if the scanned document includes lines that are very long (either because the document has writing all the way to its edges, or else because it is wider than the sheet of paper used for reproduction), then information is lost at the sides. A solution that already constitutes an improvement, consists in reducing the spacing of pixels along each line in the same ratio as the spacing between lines: this avoids deformation, but information can still be lost from the edges if the document to be transmitted is short. A better solution consists in also computing the horizontal reduction ratio Rh between the available print width and the maximum scan width to be reproduced, in determining which of the two reduction ratios (vertical and horizontal) is smaller, and in using the smaller reduction ratio when printing, both for controlling the spacing between lines of pixels and the spacing between pixels along a same line.

Then, optimum use is made of the available area and the original document is not deformed. Since no lines are omitted, the image is not degraded.

Although that solution is not generally useful, it is possible to modify the spacing between successive lines and the spacing between pixels in a same line, during printing, for magnification as well as for reduction (i.e. to provide for reduction ratios that are greater than 1 as well as ratios that are less than 1).

The invention also provides a printing apparatus suitable for implementing the above-defined method. The apparatus comprises a light source (generally a laser diode) providing a beam that is modulated by the input signal and is controlled for scanning, at a rate fixed by a clock, along a generatrix line of a photosensitive drum which is rotated by a motor; it further includes means for storing input data representing successive pixels of all of the lines in a document page which were scanned for transmission, means for determining the length to be reproduced of the transmitted document, e.g. in the form of a number of scan lines at a given spacing, and for determining the width, e.g. in the form of the number of scanned pixels, necessary to avoid truncating the information contained in any of the scan lines, in the width direction, means for calculating the minimum vertical reduction ration Rv and the minimum horizontal reduction ratio Rh that should be adopted in order to enable the useful information to be reproduced, and for selecting the smaller of said ratios, and means for controlling the frequency of the clock and the motor of the drum so as to achieve said smaller reduction ratio both in the horizontal direction and in the vertical direction.

The invention will be better understood from the following description of a particular embodiment given as a non-limiting example. This embodiment performs printing by an electro-photographic or laser technique. However, that is merely one example, and the invention is equally applicable whenever printing is performed by printing successive pixels along a given line, line after line.

The description refers to the accompanying drawings.

DETAILED DESCRIPTION OF A PREFERRED EMBODIMENT

For an A4 size sheet, of length L and width W respectively equal to 297 mm and 210 mm, the area available for printing is generally limited to l=289 mm and w=208 mm, assuming that a top margin must be left free for printing the call identification line of characters. The 3 mm bottom margin is necessary to enable the paper feed device to take hold of the sheet.

The transmitted document may be in A4 format, but it may include marks that extend beyond the reproducible zone, or it may be in a larger format, e.g. B4 or American foolscap.

Conventionally, for transmission, a document is scanned line by line by a strip of photodetectors of sufficient length to provide a signal for each pixel of the scanned sheet, even if the sheet is slightly off center relative to the strip. Conventionally, a strip is used having 1728 photodetectors distributed over a width of 216 mm. The data representing successive pixels are transmitted pixel by pixel and then line by line. The data are stored page by page in the receiving facsimile machine prior to reproducing the page, with this being done by means that are not described herein since they may have any conventional structure. By comparing the luminance information relating to each pixel with a threshold, it is possible to determine whether the pixel represents meaningful information or belongs to the background of the document to be reproduced. It is therefore possible to determine the information-bearing length $l_0$ of the document and the minimum width $w_0$ to be reproduced in order to avoid loosing information at the edges.

Figure 1:
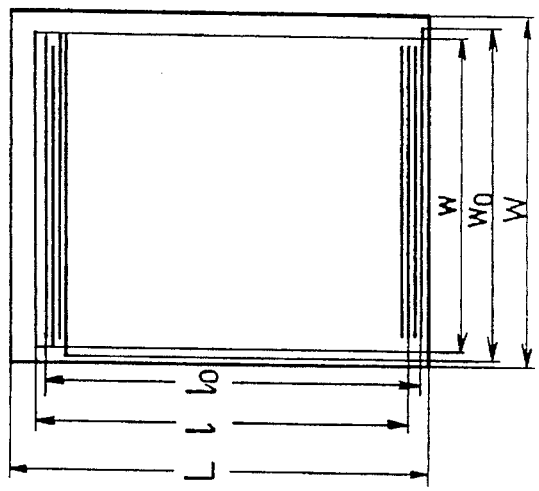
FIG. 1 is a diagram showing the useful print area available on an A4 format sheet, when printing is performed by an electro-photographic technique using a dry toner.
Figure 2:
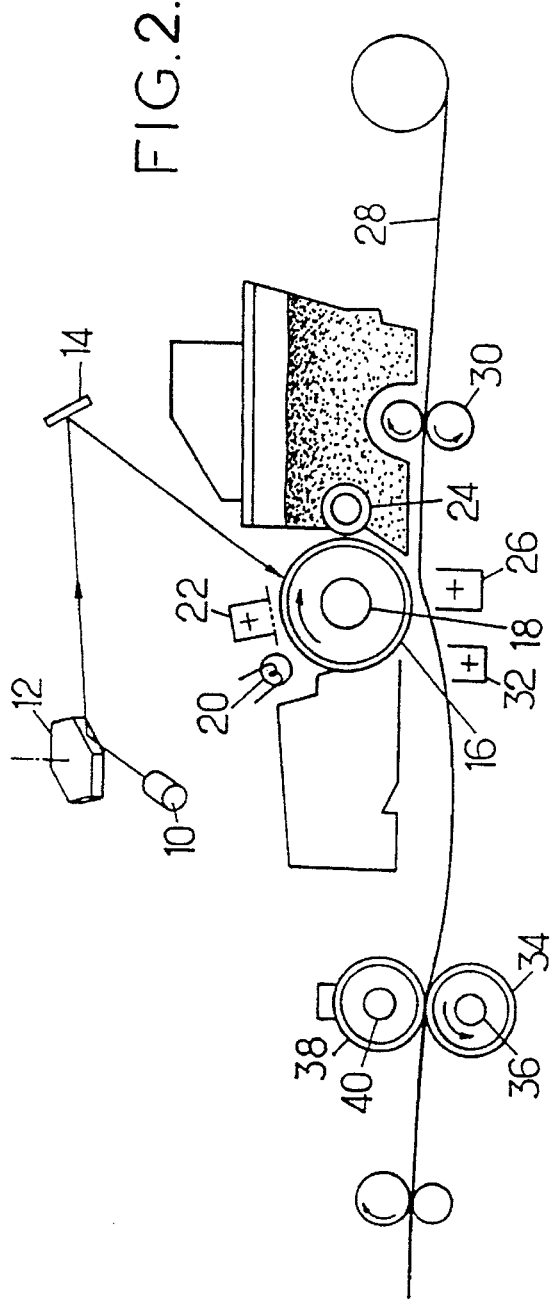
FIG. 2 is a diagram showing a printing apparatus whose general structure is commonly used in a laser-printing facsimile machine, suitable for implementing the invention.
Figure 3:
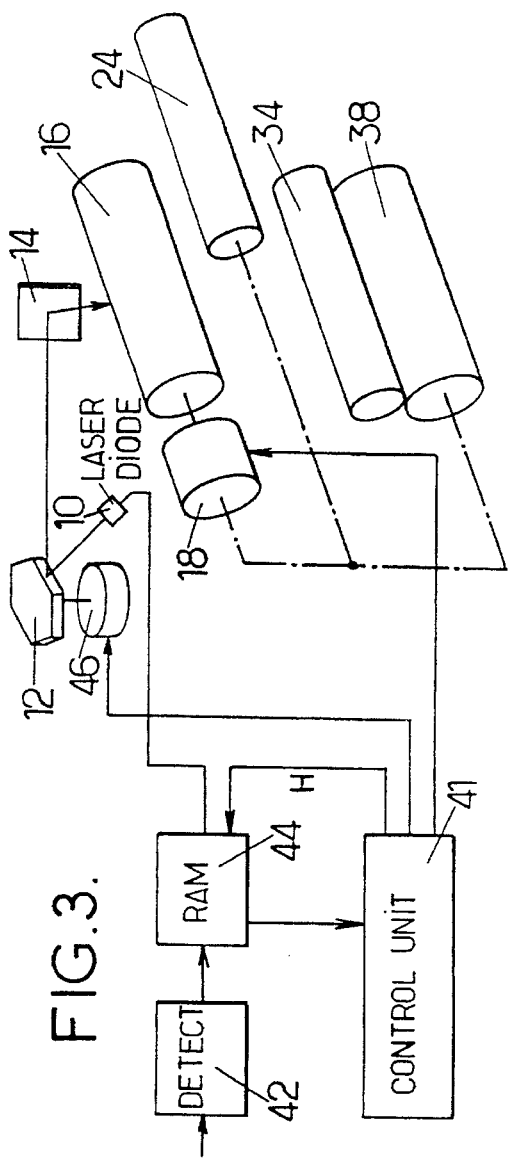
FIG. 3 is a block diagram of electronic circuits suitable for use in the apparatus of FIG. 2.

As shown diagrammatically in FIGS. 2 and 3, a printing apparatus of a facsimile machine comprises a light source 10 (generally a laser diode) that delivers a beam which is focussed and received by a polygonal mirror 12 for line scanning and which is reflected by a beam-folding mirror 14 onto a photosensitive drum 16 that is rotated by a main motor 18. This drum generally has a diameter of a few cm and it is covered with a layer of photoconductive material (organic material or selenium). Each generatrix line of drum 16 (line parallel to the drum axis) passes in turn successively past a lamp 20 for eliminating residual electrostatic charges, a Corona generator 22 for depositing electrostatic charges uniformly onto the drum 16 and a location where it is exposed to the light beam. The beam discharges the surface of the drum at each point by an amount that is a function of the amount of light which was received by the point.

Each generatrix of the drum then passes to a developing location where the latent image of the photosensitive drum is transformed into a visible image by deposition of a dry toner.

The toner typically has two components and it is driven by a magnetic roller rotating inside a sleeve 24. The toner adheres to the drum 16 in those zones that have been exposed and the density of the deposit depends on the degree of the exposure. In a transfer station, where a generator 26 creates a Corona discharge, the dry ink is transferred onto a sheet of paper 28 that is delivered by a feed mechanism 30.

The paper, possibly after being electrically discharged by passing through a station 32, finally passes through a fixing station. Conventionally, the dry toner is fixed by pressure and by heat. To do this, the station includes a pressing roller 34 driven by a motor 36 (or more frequently by a take off from the main motor 18), and a heater roller 38 which is maintained at a regulated temperature by a central heater member 40, generally constituted by a halogen lamp. With conventional dry toners, the regulated temperature is about 500° C. A probe detects the temperature of the drum 38 and switches the lamp on whenever the temperature drops below a given value $\theta_0$. The lamp is switched off whenever another temperature $\theta_1$, greater than $\theta_0$, is exceeded.

The printing apparatus further includes control means that are generally integrated in a control unit 41 including a microprocessor and controlling the facsimile machine. This unit is connected to electrical and telephone circuits of generally conventional structure. Such circuits may be considered as including a circuit 42 for detecting incoming calls and for storing a protocol for establishing communication with the calling party. Once communication has been established, data representative of the document to be reproduced are received and stored page by page in a memory 44.

To print a line, the light beam is modulated by the stored data while the mirror is rotated by a motor 46. After each line has been written, the control unit 41 of the printer actuates the conventional main motor 18 to advance the drum 16 by a determined and constant step.

The structure described above is commonplace. However, in accordance to the invention, the mirror 12 and the drum 16 are controlled differently from the way they are controlled in conventional laser printers for facsimile machines. More precisely, the printer is designed to adjust the horizontal and vertical printing resolution at a value that enables best possible use to be made of the area available on the sheet of paper for printing.

In an advantageous embodiment, the motor 18 for driving the photosensitive drum 16 is a servo-controlled DC motor instead of a conventional stepper motor. The speed of rotation of this drive motor is controlled by the control unit 41 responsive to the resolution to be obtained, which itself depends on the reduction ratio required for printing all of the scanned information on the available area. The motor 46 may be controlled at the frequency of a clock belonging to the control unit 41.

Each new line of pixels in the input message is marked by a "start of line" mark. The time interval between two start-of-line marks is constant. A straightforward solution, once the reduction ratio has been calculated, consists in:

controlling the movement of the laser beam, i.e. the rate at which it passes from one pixel to the next, from an external clock synchronized from the start-of-line mark and having a frequency (that determines the rate at which the beam passes from one pixel to the next) that is selected to have a value proportional to the reduction ratio to be obtained (for a given speed of the motor 46); and servo-controlling the speed of rotation of the motor 18 responsive to the resolution to be obtained, such that the spacing between two successive lines is directly proportional to the rotational speed of the motor, since the time interval between two start of line marks is constant.

The reduction ratio may be computed by the control unit 41 on the basis of information transmitted from the memory 44 each time a complete page has been stored.

If the number of lines in the zone available for printing at nominal line spacing is written v, and if the number of lines to be printed (corresponding to the length $l_0$) is written V, then the minimum vertical reduction ratio that is necessary may be calculated as:

$$Rv=v/V$$

Similarly, if the number of pixels to be reproduced (corresponding to the width $w_0$) is written H, and if the number of pixels available per line in the printable zone at the nominal spacing is written h, then the minimum horizontal reduction ratio that can be applied is:

$$Rh=h/H$$

Under such circumstances, the smaller value among Rv and Rh is selected as a common reduction ratio for both directions.

In most cases, the data to be printed are received in the form of an analog signal. Then the pixels to be printed are defined as samples taken at time intervals corresponding to an "origin" spacing and are converted into digital form for storage.

We claim:

1. Method for facsimile printing on paper sheets of predetermined size, comprising the steps of:

storing pixels of all successive scanned lines having a predetermined spacing in each page containing data to be printed in a memory, as each said page is received as signal;

determining a significant height in said page, which contains all said data to be printed;

computing a vertical reduction ratio between a predetermined height available for printing on said paper sheet and said significant height; and printing each said page, pixel per pixel and line after line, with a vertical spacing between lines of pixels which is equal to said predetermined spacing, multiplied by said vertical reduction ratio.

2. Method according to claim 1, further comprising printing each said line with a spacing between successive pixels which is equal to an original spacing between pixels in the scanned lines, multiplied by said reduction ratio.

3. Method according to claim 1, further comprising computing a horizontal reduction ratio between an available print width on said sheet and a maximum scanned width to be reproduced, as represented by an incoming signal, determining which one of the vertical reduction ratio and the horizontal reduction ratio is smaller, and using the smaller reduction ratio when printing for controlling the vertical spacing between lines of pixels and the spacing between pixels along one line of pixels.

4. A printing apparatus for facsimile printing on a paper sheet of predetermined format, having a predetermined height available for printing and a predetermined width available for printing, comprising:

means for storing input data derived from an input signal, representing successive pixels of all lines at a predetermined spacing in a page;

a light source for delivering a light beam;

means for modulating an intensity of said light beam responsive to said input signal;

means for deflecting said light beam for said light beam to scan a generatrix line of a rotative photosensitive drum at a rate fixed by a clock;

motor means for rotating said photosensitive drum at an adjustable speed;

means for determining a length of the page to be reproduced arranged to count scan lines at said predetermined spacing from a first line containing useful data to a last line containing useful data to be printed;

means for determining a minimum width necessary to avoid truncating the information to be printed contained in any of the scanned lines in the width direction, arranged to count a number of pixels representing said minimum width;

means for computing a minimum vertical reduction ratio Rv and minimum horizontal reduction ratio Rh that should be adopted in order to reproduce useful information on the page and for selecting the smaller of said ratios; and means for controlling the frequency of the clock and the speed of said motor to achieve said smaller reduction ratio both in the horizontal direction and in the vertical direction.

5. Apparatus according to claim 4, wherein said motor means is a DC servo-controlled motor whose speed is controlled by a control unit responsive to the reduction ratio to be obtained.

6. Device according to claim 4, wherein said beam is controlled by a signal derived from the output signal of said clock.

7. Method for facsimile printing, on a paper sheet of predetermined size, of a page carrying data and received as a sequence of analogue incoming signals, each representing a successive scanned line and each marked by a start-of-line signal, said scanned lines having a predetermined line spacing, comprising the steps of:

sampling each of said analogue signals to define pixels as a respective digitized sample taken at time intervals corresponding to a predetermined pixel spacing along the line;

storing said pixels of each of all said successive scanned lines;

determining a significant height within said page as being a height which contains all said data to be printed;

computing a vertical reduction ratio between a predetermined height available for printing on said paper sheet and said significant height;

determining a maximum scanned width to be reproduced which contains all said data to be printed;

computing a horizontal reduction ratio between an available print width on said sheet and a maximum scanned width to be reproduced;

determining which one of the vertical reduction ratio and the horizontal reduction ratio is smaller; and using the smaller reduction ratio when printing for controlling a vertical spacing between lines of pixels and a spacing between pixels along one line of pixels.

8. Method according to claim 7, wherein said data to be printed are determined by comparing luminance information regarding each pixel in each of said scanned line with a predetermined threshold.

9. Method according to claim 1, wherein said data to be printed are determined by comparing luminance information regarding each pixel in each of said scanned line with a predetermined threshold.

* * * * *